US012614923B2

(12) United States Patent
Wang et al.

(10) Patent No.: US 12,614,923 B2
(45) Date of Patent: Apr. 28, 2026

(54) INTELLIGENT CLOUD-BASED ENERGY MANAGEMENT SYSTEM

(71) Applicant: Accuenergy (Canada) Inc., Toronto (CA)

(72) Inventors: Yufan Wang, Toronto (CA); Ketao Li, Toronto (CA); Liang Wang, Toronto (CA)

(73) Assignee: Accuenergy (Canada) Inc. (CA)

( * ) Notice: Subject to any disclaimer, the term of this patent is extended or adjusted under 35 U.S.C. 154(b) by 363 days.

(21) Appl. No.: 18/411,042

(22) Filed: Jan. 12, 2024

(65) Prior Publication Data

US 2025/0233451 A1     Jul. 17, 2025

(51) Int. Cl.
*H02J 13/12*        (2026.01)
*H02J 13/10*        (2026.01)

(52) U.S. Cl.
CPC .............. *H02J 13/12* (2026.01); *H02J 13/10* (2026.01)

(58) Field of Classification Search
CPC .................................. H02J 13/12; H02J 13/10
See application file for complete search history.

(56) References Cited

U.S. PATENT DOCUMENTS

| | | | |
|---|---|---|---|
| 6,327,541 B1 * | 12/2001 | Pitchford | ............... G01D 4/004 |
| | | | 705/413 |
| 7,272,518 B2 | 9/2007 | Bickel et al. | |
| 9,709,604 B2 | 7/2017 | Driscoll et al. | |
| 11,480,596 B2 * | 10/2022 | Anderson | ............ G01R 22/063 |

| | | | |
|---|---|---|---|
| 2016/0109497 A1 * | 4/2016 | Aiello | ................... H02J 13/333 |
| | | | 324/76.77 |
| 2017/0006135 A1 * | 1/2017 | Siebel | ........................ G06F 8/10 |
| 2017/0161478 A1 * | 6/2017 | Stavrou | ................... G06F 21/32 |
| 2020/0293032 A1 * | 9/2020 | Wang | ................ G01R 19/2513 |
| 2020/0310394 A1 * | 10/2020 | Wouhaybi | ............... H04L 67/12 |
| 2021/0221247 A1 * | 7/2021 | Daniel | .................... B60L 53/68 |
| 2022/0123552 A1 * | 4/2022 | Pathak | .................... H02J 3/001 |

(Continued)

OTHER PUBLICATIONS

AcuCloud Energy Management Software, Accuenergy Inc., Canada, https://www.accuenergy.com/products/acucloud-energy-management-software-ems/.

(Continued)

*Primary Examiner* — Ziaul Karim
(74) *Attorney, Agent, or Firm* — Dhiraj Jindal; PATENT YOGI LLC

(57)        ABSTRACT

The invention presents an energy management system for power distribution networks. It features a hierarchical network with multi-level metering nodes, each measuring energy usage. Data from these nodes are transmitted via a secure communication gateway to a cloud-based platform, which includes servers for processing and storage. A key component is a machine learning algorithm within the server, designed to analyze energy data, normalize and transform inputs, and identify anomalies. The algorithm generates anomaly scores for each power meter, reflecting potential operational issues. A user interface, accessible through client devices, displays the processed data and anomaly scores. This allows users to effectively monitor and manage the energy distribution, making informed decisions for optimization. The system enhances the efficiency and reliability of power distribution, offering advanced analysis and user-friendly monitoring capabilities.

8 Claims, 3 Drawing Sheets

(56)  References Cited

U.S. PATENT DOCUMENTS

| | | | |
|---|---|---|---|
| 2022/0319304 A1* | 10/2022 | Menzel ................ | G08B 29/185 |
| 2023/0021214 A1* | 1/2023 | Lehmer ................ | G01R 31/086 |
| 2023/0231378 A1* | 7/2023 | Buttgenbach .......... | H02J 3/003 |
| | | | 307/38 |

OTHER PUBLICATIONS

Make Energy Usage Smarter, Accuenergy Inc., Dec. 2023, Version: 1.5.4, pp. 38, Canada, https://accucdn.accuenergy.com/wp-content/uploads/Accuenergy-Product-Catalogue.pdf.

\* cited by examiner

<u>200</u>

INTELLIGENT CLOUD-BASED ENERGY MANAGEMENT SYSTEM

FIELD OF THE INVENTION

The present invention generally relates to an energy management system, more specifically, to an intelligent Cloud-based energy management system.

BACKGROUND OF THE INVENTION

Traditional energy management systems often struggle with efficiently handling and analyzing vast amounts of data generated by power distribution networks. These networks, characterized by their complex hierarchical structures, pose significant challenges in terms of data aggregation, processing, and interpretation. Existing systems frequently lack the capability to effectively identify patterns and anomalies in energy usage data, which is crucial for ensuring operational efficiency and reliability. Additionally, conventional approaches generally do not provide intuitive and user-friendly interfaces for end-users to access and utilize energy data, thereby limiting the potential for proactive energy management and optimization.

Furthermore, with the increasing complexity of power distribution networks and the growing emphasis on energy conservation and sustainability, there is a pressing need for more advanced systems that can leverage modern computing and machine learning technologies. Such systems should be capable of not only handling large-scale data but also providing sophisticated analysis to detect irregularities and inefficiencies in the network.

Therefore, there exists a need for an improved energy management system that addresses these challenges by incorporating advanced data processing techniques, machine learning algorithms, and user-centric interfaces.

SUMMARY OF THE INVENTION

The embodiments of the present disclosure generally related to an energy management system.

In some embodiments, the energy management system comprises a hierarchical power distribution network configured with a plurality of metering nodes organized across multiple hierarchical levels, wherein each level comprises one or more power meters for measuring energy usage, and wherein higher-level meters aggregate energy usage data from lower-level meters; a communication gateway operatively connected to the power distribution network for secure and efficient transmission of energy usage data; a cloud-based computing platform comprising a server for data processing and a database server for data storage, wherein the cloud-based computing platform is configured to receive transmitted energy usage data from the communication gateway; a machine learning algorithm executed within the server, wherein the machine learning algorithm is configured to analyze the received energy usage data, the machine learning algorithm comprising a data preprocessing module for normalizing and transforming the energy usage data, and a trained neural network model for identifying patterns and anomalies in the energy usage data; wherein the machine learning algorithm is further configured to generate an anomaly score for each power meter based on the analyzed data, the anomaly score representing a likelihood of operational irregularities in the power meters; and a user interface accessible to users through client devices, the user interface configured to display analyzed data and corresponding anomaly scores, and to enable users to make informed decisions for energy management and optimization based on the displayed data.

In some embodiments, the energy management system further comprises a notification module within the server configured to generate and send alerts to designated customers; wherein the notification module is activated when the machine learning algorithm identifies that an anomaly score for a power meter exceeds a predefined threshold; wherein the alert is transmitted to designated customers via at least one communication method selected from a group consisting of email, Short Message Service (SMS), and telephone call.

In some embodiments, the energy management system further comprises a data reassessment module configured to flag and reassess the measurements from a power meter within the power distribution network when the anomaly score for the power meter exceeds a predetermined threshold, indicating potential measurement inaccuracies; wherein the data reassessment module is configured to employ a compensatory calculation method to calculate alternative measurement values for the flagged power meter by utilizing readings from adjacent nodes within the hierarchical power distribution network; wherein the compensatory calculation method includes deriving an equivalent measurement value for the flagged power meter by subtracting the aggregate of readings from sibling nodes within the hierarchy from the reading of the parent node, or by summing the readings from the immediate child nodes of the flagged power meter; and wherein the equivalent measurement value is utilized as a substitute for the original reading of the flagged power meter to maintain the accuracy and reliability of the data within the power distribution network.

In some embodiments, the user interface is further configured to classify and display the anomaly scores in at least three distinct categories based on their severity levels.

In some embodiments, the user interface includes a color-coded status indicator for each power meter, the color coding representing different levels of operational performance based on the anomaly scores; with specific colors assigned to indicate normal operation, caution, and critical conditions, thereby providing an intuitive visual representation of the power network's status for quick assessment by the users.

In some embodiments, the user interface is configured to provide a customizable dashboard that allows users to select and prioritize specific data points or metrics, including anomaly scores, for display; enabling users to tailor the interface according to their specific monitoring and management needs, and enhancing the ease of access to the most relevant information.

In some embodiments, the user interface features an interactive map of the power distribution network, visually representing the location and status of each metering node; the map interface enabling users to click on individual nodes to retrieve detailed data and anomaly scores, thereby facilitating a spatial understanding of the network's performance.

In some embodiments, the user interface incorporates a notification filter module, allowing users to set customizable alert thresholds and preferences for receiving notifications based on the severity of anomaly scores; such customization enabling users to focus on the most critical alerts and reduce notification fatigue.

In some embodiments, the user interface includes a historical data analysis tool that allows users to view and compare anomaly scores over time for each metering node; providing insights into historical trends and patterns in energy usage and operational irregularities, aiding in long-term strategic planning and preventive maintenance scheduling.

These and other features and aspects of the present disclosure will become fully apparent from the following detailed description of exemplary embodiments, the appended claims and the accompanying drawings.

DETAIL DESCRIPTIONS OF THE INVENTION

Embodiments of the present disclosure will be described herein with reference to the accompanying drawings. In the following descriptions, well-known functions or constructions are not described in detail to avoid obscuring the present disclosure. The word "exemplary" is used herein to mean "serving as an example." Any configuration or design described herein as "exemplary" is not to be construed as preferred, or advantageous, over other configurations or designs. Herein the phrase "coupled" is defined as "directly connected to or indirectly connected with" one or more intermediate components. Such intermediate components may include both hardware and software-based components.

It is further noted that, unless otherwise indicated, all functions described herein may be implemented in either software, hardware, or some combination thereof.

It should be recognized that the present disclosure can be performed in numerous ways, including as a process, an apparatus, a system, a method, or a computer-readable medium such as a computer storage medium.

Figure 1:
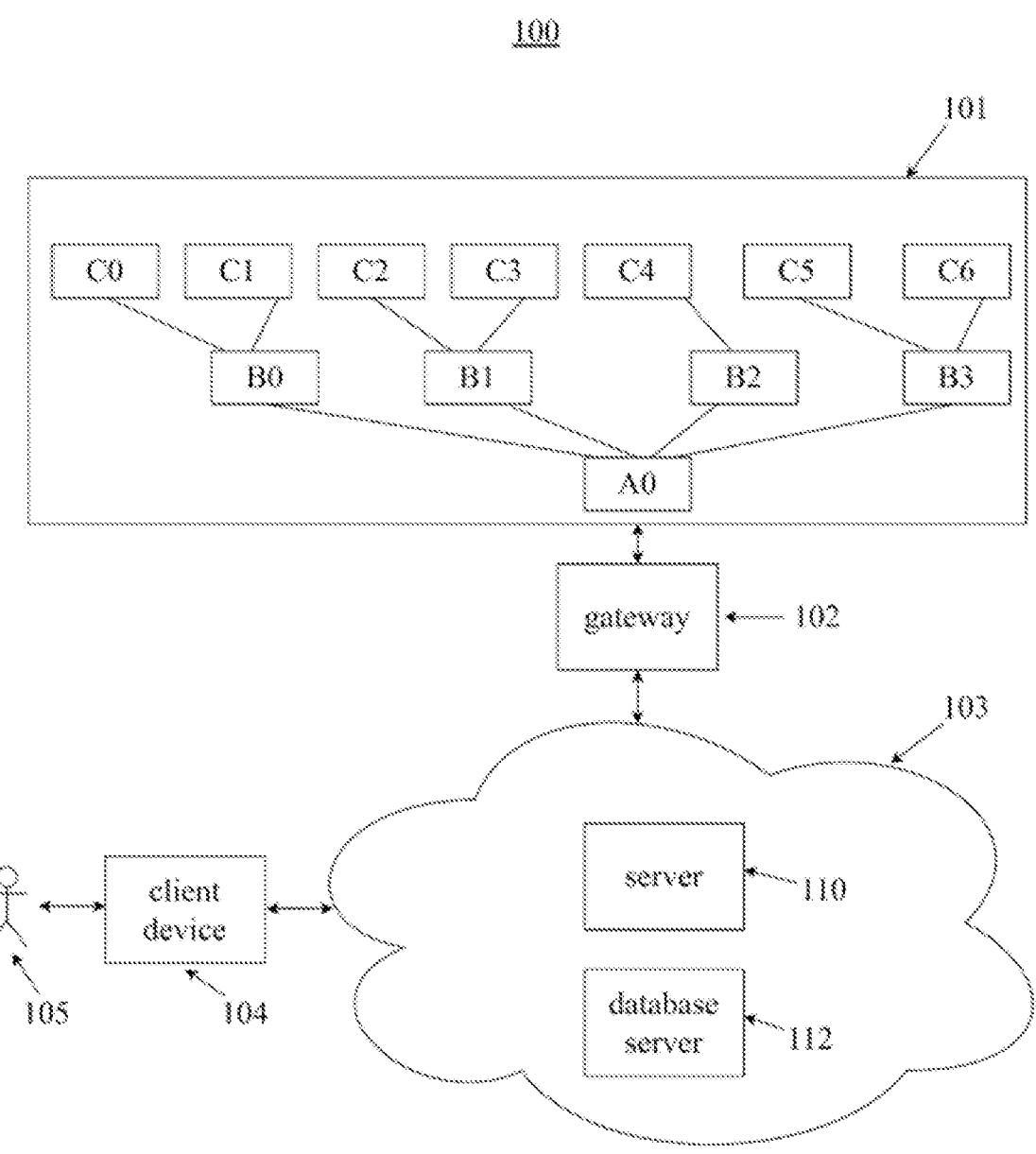
FIG. 1 is a diagram illustrating the exemplary architecture of an intelligent Cloud-based energy management system according to some embodiments of the present invention.

FIG. 1 illustrates the exemplary architecture of the Intelligent Cloud-Based Energy Management System 100, designed to offer advanced monitoring and management capabilities for power distribution networks. This system comprises a hierarchical power distribution network 101 and a gateway 102. The core of the system's data processing and storage capabilities, represented by server 110 and database server 112, are deployed on a cloud platform 103, ensuring scalable and efficient management of data and resources.

The power distribution network 101 comprises a multi-level metering infrastructure to accurately measure and report energy usage and distribution. At the top level of this hierarchy is the main power meter, labeled as A0, responsible for overseeing the overall energy flow of the system. The middle level includes four subsidiary power meters labeled B0, B1, B2, and B3, each functioning as a node that collects and relays data from their respective sectors of the network. These meters are considered subordinate to the top-level meter A0 and provide a more granular view of energy distribution. The lowest level consists of eight additional power meters labeled C0 to C7, which offer the most detailed insights into energy consumption. These meters are organized within a hierarchical structure where the current, power, and energy measurements at a parental node are the aggregate of the measurements from its child nodes. Specifically, the measurements at meter B0 are the sum of those at meters C0 and C1; the measurements at B1 are the sum of C2 and C3; B2's measurements come from C4; and the measurements at B3 are the combined totals from C5 and C6.

Gateway 102 serves as the critical communication bridge between the power distribution network 101 and the cloud platform 103. It is responsible for the secure and efficient transmission of data collected from the various meters in the power distribution network 101 to the cloud-based servers.

The cloud platform 103 hosts the server 110 and the database server 112, providing scalable computing resources and storage capabilities. The database server 112 is tasked with storing vast amounts of data transmitted from the power distribution network 101. This data encompasses real-time and historical power usage metrics, energy distribution patterns, and other relevant operational parameters.

Server 110 is responsible for processing and analyzing the data stored in the database server 112. Utilizing sophisticated algorithms and data processing techniques, server 110 can identify trends, detect anomalies, and generate actionable insights.

Customers, such as building managers, represented as customer 105, can access the server 110 through client devices 104, which may include PCs, tablets, or mobile phones. The server 110 provides a user interface, possibly in the form of an interactive dashboard, allowing customers to view and analyze the energy data, monitor the performance of the power distribution network, and make informed decisions for energy management and optimization.

In some embodiments, the energy management system 100 further comprises a notification module within the server configured to generate and send alerts to designated customers; wherein the notification module is activated when the machine learning algorithm identifies that an anomaly score for a power meter exceeds a predefined threshold; wherein the alert is transmitted to designated customers via at least one communication method selected from a group consisting of email, Short Message Service (SMS), and telephone call.

The notification module is an integral part of the server within the cloud-based computing platform of the energy management system. It is specifically designed and configured to generate and dispatch alerts to designated customers. The module is embedded in the server's architecture and programmed to initiate alert protocols under certain predefined conditions.

The primary trigger for the notification module's activation is the identification of an anomaly score that exceeds a pre-established threshold. This anomaly score is generated by the machine learning algorithm, which continuously analyzes energy usage data from the power meters in the hierarchical power distribution network. When the algorithm detects an anomaly score that surpasses the set threshold—indicative of potential operational irregularities in a power meter—it signals the notification module to initiate the alert process.

Upon activation, the notification module proceeds to generate an alert specific to the identified issue. This alert comprises pertinent information about the anomaly, including the affected power meter and details of the detected irregularity. The module is equipped with functionalities to format this information into a clear and concise message suitable for customer comprehension.

The system is configured to transmit these alerts to designated customers through various communication channels. The preferred methods of communication are email, Short Message Service (SMS), and telephone calls. The system allows for the specification of customer preferences regarding the method of alert transmission, enabling customization to suit individual customer needs. The choice of communication method can be predetermined by the customers or dynamically selected based on the urgency or nature of the anomaly detected.

While the notification module operates independently in sending alerts, it is seamlessly integrated with the machine learning algorithm and the overall system architecture. The alerts generated contribute to the system's objective of enabling efficient energy management and operational optimization. Additionally, the user interface, accessible through client devices, may provide customers with options to manage their alert preferences and view detailed information about received alerts.

In some embodiments, the energy management system 100 further comprises a data reassessment module configured to flag and reassess the measurements from a power meter within the power distribution network when the anomaly score for the power meter exceeds a predetermined threshold, indicating potential measurement inaccuracies; wherein the data reassessment module is configured to employ a compensatory calculation method to calculate alternative measurement values for the flagged power meter by utilizing readings from adjacent nodes within the hierarchical power distribution network; wherein the compensatory calculation method includes deriving an equivalent measurement value for the flagged power meter by subtracting the aggregate of readings from sibling nodes within the hierarchy from the reading of the parent node, or by summing the readings from the immediate child nodes of the flagged power meter; and wherein the equivalent measurement value is utilized as a substitute for the original reading of the flagged power meter to maintain the accuracy and reliability of the data within the power distribution network.

The primary function of the data reassessment module is to monitor and evaluate the anomaly scores generated for each power meter by the machine learning algorithm, as detailed in claim 1. When the module detects that an anomaly score for a power meter exceeds a predefined threshold, it flags this as indicative of potential inaccuracies in the meter's measurements. The predetermined threshold is set based on historical data and operational parameters to identify significant deviations from normal measurement patterns.

Upon flagging a power meter, the data reassessment module initiates a compensatory calculation method. This method is designed to calculate alternative measurement values for the flagged meter, thereby compensating for potential inaccuracies. The module achieves this by utilizing readings from adjacent nodes within the hierarchical structure of the power distribution network.

There are two primary approaches employed by the module in this compensatory calculation:

1. Subtraction from Parent Node: The module derives an equivalent measurement value for the flagged meter by subtracting the aggregate readings of its sibling nodes from the reading of its parent node within the hierarchy.

2. Summation from Child Nodes: Alternatively, the module can sum the readings from the immediate child nodes of the flagged meter to obtain an equivalent measurement value.

For example, a measurement value equivalent to meter B0's expected reading is derived from the parent node, A0, by subtracting the aggregate of readings from other sibling nodes (B1, B2, and B3). Another equivalent measurement is obtained by summing the readings from B0's immediate child nodes (C0 and C1).

The equivalent measurement value calculated by either of these methods is then utilized as a substitute for the original reading of the flagged power meter. This approach ensures that despite potential inaccuracies in the meter's own readings, the overall data integrity and reliability of the power distribution network's measurements are maintained.

The data reassessment module is seamlessly integrated with the cloud-based computing platform the energy management system. This integration ensures that the reassessment and compensatory calculations are efficiently executed and that the resulting data is accurately reflected in the system's analytics and reporting processes.

By incorporating this data reassessment module, the energy management system enhances its capability to provide precise and reliable energy data analytics. This feature is particularly crucial for complex power distribution networks where measurement accuracy is pivotal for operational efficiency and energy optimization.

In some embodiments, the user interface is further configured to classify and display the anomaly scores in at least three distinct categories based on their severity levels.

The user interface is equipped with a feature that categorizes anomaly scores into at least three distinct categories. These categories are based on the severity levels of the anomalies detected in the power meters within the power distribution network. The severity levels are defined as follows:

Low Severity: This category encompasses anomaly scores that indicate minor irregularities, which may not require immediate attention but are noteworthy for monitoring.

Medium Severity: Anomaly scores falling into this category represent more significant irregularities that may necessitate closer observation or timely intervention.

High Severity: This category is reserved for the highest anomaly scores, signaling critical operational irregularities that likely require immediate and decisive action.

The user interface displays these categorized anomaly scores in a manner that is easily interpretable and visually distinguishable. This can be achieved through various means, such as color coding (e.g., green for low, yellow for medium, and red for high severity), distinct icons, or separate sections within the interface.

The categorization of anomaly scores allows users, such as network operators or energy managers, to quickly identify and prioritize issues within the power distribution network. It enhances the usability of the user interface by simplifying the presentation of complex data, enabling users to focus on the most critical issues first. Furthermore, this feature aids in decision-making processes related to energy management and operational optimization, as users can more efficiently allocate their attention and resources based on the severity of the anomalies.

This enhanced user interface feature is fully integrated with the other components of the energy management system, including the machine learning algorithm and the cloud-based computing platform. It utilizes the data processed and analyzed by these components to provide a streamlined and user-centric experience.

In some embodiments, the user interface includes a color-coded status indicator for each power meter, the color coding representing different levels of operational performance based on the anomaly scores; with specific colors assigned to indicate normal operation, caution, and critical conditions, thereby providing an intuitive visual representation of the power network's status for quick assessment by the users.

The user interface features a distinct color-coding scheme for the status indicators associated with each power meter. This color coding is directly linked to the anomaly scores generated by the machine learning algorithm, reflecting varying levels of operational performance. The color scheme is designed to be intuitive and easily interpretable, enabling users to quickly assess the status of the power network.

The color-coding system categorizes the operational performance into at least three distinct levels:

Normal Operation: A specific color, such as green, is designated to represent power meters that are functioning within normal operational parameters, as indicated by their anomaly scores.

Caution: Another color, such as yellow, is used to signify a level of caution. This indicates that the power meter's anomaly score has deviated from the norm but is not yet in a critical range.

Critical Conditions: A different color, such as red, is assigned to power meters that are in critical condition, highlighting significant operational irregularities that may require immediate attention.

This color-coded system enables users, such as network operators or facility managers, to conduct a rapid visual assessment of the entire power network's status. Users can identify at a glance which meters are operating normally, which require monitoring, and which need urgent attention. This facilitates more efficient and effective management of the power distribution network.

The color-coded status indicators are seamlessly integrated into the user interface, which, in turn, is part of the broader energy management system. The system's server processes the anomaly scores and updates the user interface, accordingly, ensuring that the color-coded indicators are always reflective of the current operational status of each power meter.

By providing an intuitive visual representation of the power network's status, the enhanced user interface aids users in making informed decisions. This feature is especially beneficial in complex power distribution networks, where quick identification of issues is crucial for maintaining operational efficiency and energy optimization.

In some embodiments, the user interface is configured to provide a customizable dashboard that allows users to select and prioritize specific data points or metrics, including anomaly scores, for display; enabling users to tailor the interface according to their specific monitoring and management needs, and enhancing the ease of access to the most relevant information.

The customizable dashboard is a key feature designed to enhance user interaction with the energy management system. It allows users to personalize their experience by selecting and prioritizing specific data points or metrics for display. This customization capability is critical in managing the vast amount of data generated by the power distribution network.

Users can choose from various data points, such as anomaly scores from power meters, energy consumption metrics, operational status indicators, and other relevant information provided by the system. The dashboard enables users to arrange and prioritize these data points according to their individual monitoring and management needs.

The dashboard is designed to be highly adaptable, accommodating the diverse requirements of different users. For instance, a facility manager may prioritize real-time energy consumption data, while a maintenance engineer might focus on anomaly scores and alerts. The dashboard facilitates this adaptability, ensuring that each user can quickly access the information most pertinent to their role.

By enabling users to tailor the display of the user interface, the customizable dashboard significantly enhances the ease of access to relevant information. It allows users to create a more focused and efficient monitoring environment, reducing the time and effort required to navigate through large sets of data.

The customizable dashboard is fully integrated with the other components of the energy management system. It utilizes data processed by the cloud-based computing platform and the machine learning algorithm, ensuring that the information displayed is up-to-date and accurate.

This customization feature empowers users by giving them control over the information presented, leading to more effective and efficient decision-making processes. It is particularly beneficial in complex power distribution networks where timely access to specific data can significantly impact operational efficiency and energy optimization.

In some embodiments, the user interface features an interactive map of the power distribution network, visually representing the location and status of each metering node; the map interface enabling users to click on individual nodes to retrieve detailed data and anomaly scores, thereby facilitating a spatial understanding of the network's performance.

The interactive map is a key feature within the user interface, designed to provide a visual representation of the entire power distribution network. This map displays the geographical location and operational status of each metering node within the network. The status representation on the map is synchronized with the real-time data and anomaly scores generated by the machine learning algorithm, ensuring up-to-date accuracy.

Each metering node is visually represented on the map, offering users an intuitive understanding of the network's layout and performance. The map may use color-coding or other visual indicators to reflect the operational status of these nodes, such as normal operation, caution, or critical conditions based on their anomaly scores.

A significant feature of the interactive map is its ability to enable users to engage with the network's spatial layout actively. Users can click on individual metering nodes displayed on the map to access more detailed information. This click-through functionality reveals specific data related to the selected node, including precise energy usage metrics, historical data, and the node's anomaly score.

By integrating this interactive map into the user interface, the energy management system substantially enhances users' spatial understanding of the network's performance. This feature allows users to correlate geographical location with operational data, providing a comprehensive view of the network's health and efficiency.

The interactive map is seamlessly integrated within the user interface, drawing on data processed by the cloud-based computing platform and analyzed by the machine learning algorithm. This ensures that the map reflects the most current and relevant information, aiding users in making informed decisions about energy management and optimization strategies.

The inclusion of the interactive map significantly improves the user experience by offering a more engaging and informative way to interact with the power distribution network. It facilitates quicker identification of issues and anomalies at specific locations, aiding in prompt and targeted responses to operational challenges.

In some embodiments, the user interface incorporates a notification filter module, allowing users to set customizable alert thresholds and preferences for receiving notifications based on the severity of anomaly scores; such customization enabling users to focus on the most critical alerts and reduce notification fatigue.

The notification filter module is a specialized feature designed to enhance the system's alert and notification capabilities. It allows users to set and customize alert thresholds based on the severity of the anomaly scores generated by the machine learning algorithm. This module provides users with the flexibility to define their criteria for what constitutes a critical alert, ensuring that they receive notifications that are most pertinent to their specific monitoring and management needs.

Users can interact with the notification filter module to specify the levels of anomaly scores that should trigger alerts. For example, users may choose to receive notifications only for anomaly scores that indicate high-severity operational issues, while opting not to be alerted for lower-severity anomalies. This customization can be based on numerical ranges, percentage changes, or specific operational parameters.

Beyond setting alert thresholds, the notification filter module allows users to specify their preferences for how they wish to receive notifications. Users can select from various notification methods, such as email, SMS, or in-app notifications, and can determine the frequency and timing of these alerts.

One of the key benefits of the notification filter module is its role in reducing notification fatigue. By enabling users to receive only those alerts that are most relevant and critical, the module prevents the overload of information and ensures that users are not desensitized to important alerts. This targeted approach to notifications enhances the effectiveness of the energy management system.

The notification filter module is fully integrated into the user interface and works in conjunction with the overall energy management system. It utilizes the data processed by the system's server and cloud-based platform, ensuring that alert customizations are based on accurate and up-to-date information.

The inclusion of the notification filter module in the user interface significantly enhances the user experience by providing greater control over alert management. It contributes to more efficient operational monitoring and energy management, as users can focus their attention on addressing the most critical issues identified by the system.

In some embodiments, the user interface includes a historical data analysis tool that allows users to view and compare anomaly scores over time for each metering node; providing insights into historical trends and patterns in energy usage and operational irregularities, aiding in long-term strategic planning and preventive maintenance scheduling.

The historical data analysis tool is an integral component of the user interface that enables users to access, view, and compare anomaly scores over time for each metering node within the power distribution network. It allows for the selection of different time frames and periods for analysis, providing a comprehensive view of the historical performance of each node.

This tool is equipped with visualization capabilities that allow users to graphically represent anomaly scores and other relevant metrics over selected historical periods. Users can compare data across different nodes or within a single node over various time frames, enhancing their understanding of trends and patterns in energy usage and operational irregularities.

By analyzing historical data, the tool provides valuable insights into the long-term performance and reliability of the power distribution network. It identifies patterns and trends in energy consumption and anomalies, which are crucial for understanding the network's operational dynamics.

The historical data analysis tool is particularly beneficial for long-term strategic planning and preventive maintenance scheduling. It helps users identify potential issues before they become critical, allowing for proactive maintenance and optimization of the network. This tool aids in decision-making processes by providing empirical data that supports effective energy management strategies.

The historical data analysis tool is seamlessly integrated into the user interface of the energy management system. It works in conjunction with the system's server, cloud-based platform, and machine learning algorithm to ensure that the historical data presented is accurate, up-to-date, and reflective of the entire power distribution network.

Incorporating this tool into the user interface significantly enhances the operational efficiency of the energy management system. It empowers users with the data necessary to make informed decisions, plan maintenance schedules, and implement strategies that optimize the performance and reliability of the power distribution network.

It should be understood that the embodiment illustrated in FIG. 1, featuring the power distribution network 101, represents just one of potentially multiple power distribution networks within the scope of this invention. Similar power distribution networks can be operatively connected to the cloud platform 103, each through its respective gateway. These additional networks, while not explicitly shown in FIG. 1, are contemplated to function in a manner analogous to power distribution network 101, thereby enabling scalable and integrated management of multiple networks via the cloud platform 103.

Figure 2:
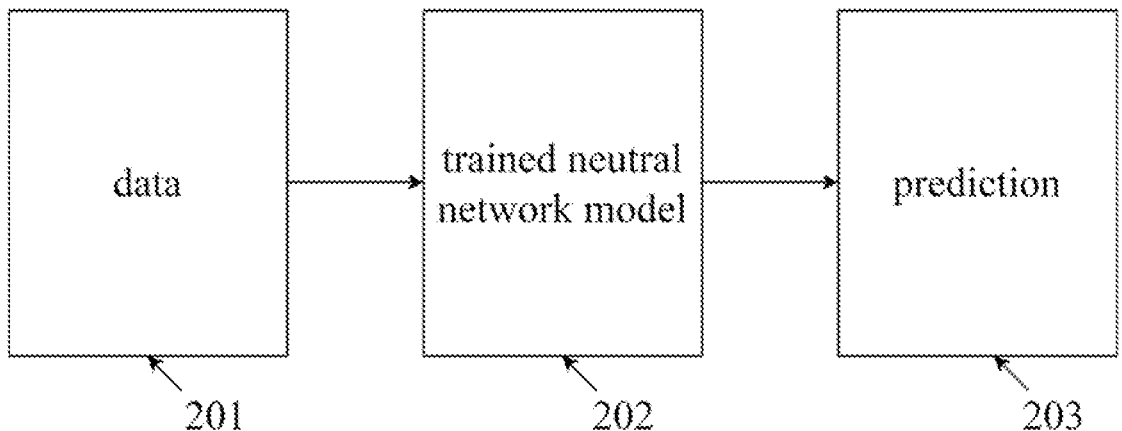
FIG. 2 is a schematic diagram of the machine learning algorithm employed in the intelligent Cloud-based energy management system according to some embodiments of the present invention.

FIG. 2 presents a schematic diagram of the machine learning algorithm employed in the Intelligent Cloud-Based Energy Management System 100, particularly executed within server 110. This algorithm is central to the system's capability to identify and predict anomalies in the power distribution network 101.

The process begins with data collection, where various types of data 201 are gathered from the power distribution network 101 and stored in the database server 112. This data includes but is not limited to real-time and historical readings of current, voltage, and power from all the meters in the network.

Prior to being input into the machine learning model, the data undergoes preprocessing in a data preprocessing module, which may involve normalization, handling of missing values, and transformation of time-stamped data into a format suitable for machine learning analysis.

The core of the machine learning algorithm is a trained neural network model 202. This model is designed to process the input data effectively, capturing complex patterns and relationships inherent in the power distribution data.

The neural network model 202 is trained on a dataset comprising various scenarios, including known instances of anomalies. This training enables the model to learn the characteristics of both normal operations and potential fault conditions. The model is capable of extracting and learning from a wide range of features, including hierarchical relationships between meters, temporal patterns, and other relevant characteristics that might influence the power distribution system's integrity.

Once trained, the neural network model 202 is utilized to analyze incoming data from the power distribution network 101. The model outputs an anomaly score for each power meter in prediction 203, indicating the likelihood of a meter being out of calibration or experiencing other operational issues.

Upon completion of its training phase, the neural network model 202 is deployed to actively analyze real-time data streaming from the power distribution network 101. As part of its operational functionality, the model systematically processes the incoming data and, for each power meter within the network, computes a predictive anomaly score and output it to prediction 203. This anomaly score serves as a quantifiable indicator, reflecting the probability of a given meter either being out of calibration or encountering various operational irregularities. The precision of this score is a direct result of the model's sophisticated learning algorithms, which are adept at identifying subtle and complex patterns indicative of potential meter malfunctions or deviations from expected performance metrics.

Anomaly scores are evaluated against predetermined thresholds. Scores exceeding these thresholds trigger alerts, prompting further investigation or immediate corrective actions.

Figure 3:
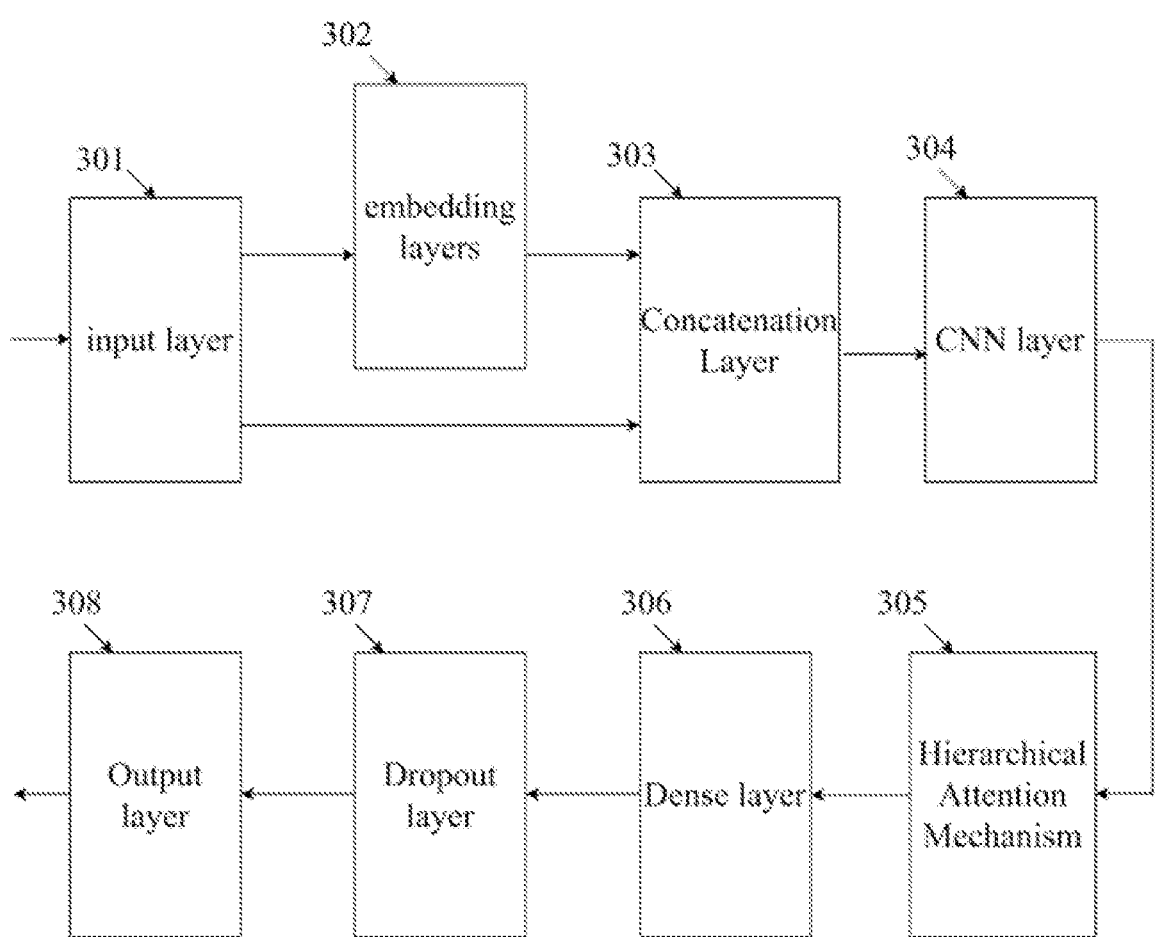
FIG. 3 is a diagram illustrating the exemplary architecture of the neural network model according to some embodiments of the present invention.

FIG. 3 presents the exemplary architecture of the neural network model 202, specifically tailored for analyzing data within the power distribution network 101.

The model commences with an input layer 301, which is designed to receive a 2D tensor representing data from the power distribution network 101. Each row in this tensor corresponds to a different meter, with columns encapsulating various categorical and numerical features associated with each meter. The input layer functions as a pass-through, directing features towards subsequent layers without any transformation.

Hereunder are some exemplary categorical features:
(1) Meter ID: Unique identifier for each meter in the network.
(2) Ancestor IDs: This feature captures the lineage or path of ancestors for each meter in the hierarchy, starting from the root meter down to the meter's immediate parent. For example, if meter C5 is a child of B3, and B3 is a child of A0 (the root), then the ancestral lineage for C5 could be represented as "A0-B3" or as a list [A0, B3].
(3) Meter Type: Classifies the meter based on its function or usage, such as residential, commercial, or industrial.
(4) Location Code: Categorical code representing the geographical location or zone where the meter is installed.
(5) Installation Date Category: Classifying the meters based on the period or year of installation, which might correlate with technology standards or metering capabilities.
(6) Manufacturer Model: Indicates the model of the meter, which could affect its performance characteristics.
Hereunder are some exemplary numerical features:
(1) Current Reading: The latest recorded electrical current measurement from the meter.
(2) Voltage Reading: The latest voltage measurement from the meter.
(3) Power Consumption: Calculated power usage based on current and voltage readings.

(4) Historical Average Consumption: Average power consumption over a specified historical period.
(5) Peak Demand: The highest recorded power demand observed by the meter over a defined timeframe.
(6) Rate of Change in Consumption: Measures the rate at which the power consumption changes over time.
(7) Outage Count: The number of times a meter has experienced an outage.
(8) Harmonic Distortion Levels: Measures the distortion in the electrical waveforms, which can be indicative of power quality issues.

In the subsequent stage, the features from the input layer 301 are divided into two distinct paths. The categorical features are routed towards the embedding layers 302, where each embedding layer transforms its respective categorical feature into a dense vector, capturing intricate relationships within the categories. Meanwhile, the numerical features bypass the embedding stage and are directly sent to the concatenation layer 303.

Each categorical feature is processed individually through its dedicated embedding layer, following a systematic approach that enhances the feature's representation. When a categorical feature, such as 'Meter Type', enters the embedding layers, it is typically in an integer-encoded form, a result of label encoding or a similar process. This integer-encoded data serves as the input to the embedding layer specifically designated for that feature.

The configuration of each embedding layer is tailored to the unique characteristics of its corresponding feature. The input dimension is set to match the number of unique categories within the feature. For instance, if 'Meter Type' comprises five unique categories, the embedding layer for this feature will have an input dimension of five. The output dimension, a hyperparameter, is selected to represent the size of the resulting dense vector. This size is determined based on factors like the complexity of the categorical feature and the overall depth of the neural network model.

Inside the embedding layer, a transformation process unfolds. Each integer-encoded category is converted into a dense vector. These vectors exist in a continuous, high-dimensional space, effectively capturing the nuanced relationships and patterns inherent within the categorical data. This transformation is key to the model's ability to discern and learn from the rich information encapsulated in these categorical features.

The culmination of this process in each embedding layer is the generation of a dense vector, corresponding to each inputted categorical feature. These dense vectors, embodying a more expressive and nuanced representation, are then suitably prepared for further processing within the neural network, offering a significant enhancement over the original categorical encodings.

In the architecture of the neural network model, the concatenation layer 303 emerges as a pivotal component, seamlessly integrating the disparate strands of data—the dense vectors from the embedding layers and the direct numerical features. This integration is crucial for the holistic analysis that the model aims to perform.

At the onset, the concatenation layer 303 engages in a process of receiving and aligning two distinct forms of input. Firstly, it receives dense vectors representing each categorical feature, outputs meticulously crafted by the embedding layers 302. These vectors encapsulate the nuanced relationships within the categorical data. Simultaneously, the layer also receives a stream of direct numerical features from the input layer 301. These features, encompassing critical metrics such as current, voltage, and power readings, provide a quantitative backbone to the data set.

The layer then embarks on an intricate process of amalgamation. Here, the dense vectors and numerical features are aligned and concatenated along a specified axis, typically the feature axis. This operation is not merely a mechanical combination but a fusion. This set now carries both the depth of categorical data and the precision of numerical metrics, setting the stage for sophisticated pattern recognition.

The data then flows into the realms of the CNN (Convolutional Neural Network) layer 304, a domain where temporal patterns are unraveled. The CNN layer is a complex assembly of multiple convolutional layers, each equipped with a set of filters or kernels. These filters are the essence of the CNN layer, gliding over the input feature set, capturing local temporal patterns and dependencies. The convolutional process hinges on carefully selected hyperparameters—the number of filters, their size, and the convolution stride—all calibrated to resonate with the unique characteristics of the input data.

As the convolutional process unfolds, it is interspersed with the application of activation functions, commonly ReLU or its variants. These functions infuse non-linearity into the model, a critical aspect that empowers the model to learn and adapt to complex patterns in the data. Optionally, the layer may also incorporate batch normalization after each convolutional step. This inclusion is strategic, aimed at enhancing training stability and efficiency by standardizing the outputs of each layer, thereby reducing internal covariate shift.

The culmination of this intricate process within the CNN layer 304 is the formation of a transformed feature map. This map is a testament to the layer's ability to discern and highlight significant temporal patterns embedded within the enhanced feature set.

In the neural network architecture, following the intricate processing by the CNN layer 304, the data enters the realm of the hierarchical attention mechanism 305. This mechanism plays a vital role in refining the feature map by focusing on the hierarchical structure inherent in the power distribution network data.

The hierarchical attention mechanism 305 is ingeniously designed to scrutinize and emphasize various hierarchical aspects embedded within the feature map received from the CNN layer. It operates based on the following principles:

1. Attention Scoring: The mechanism initially computes attention scores for each feature in the feature map. These scores are calculated using a set of trainable parameters that enable the model to learn which features are more relevant based on the hierarchical context. This scoring process involves multiplying the feature map with a weight matrix and applying a softmax function to normalize the scores.
   2. Feature Weighting: Each feature in the map is then weighted by its corresponding attention score. This weighting process effectively amplifies features that are more significant within the hierarchical structure while diminishing the less relevant ones.
   3. Output Generation: The result of this weighting process is a weighted feature set, where each feature's representation is now tailored according to its importance within the hierarchy. This weighted set embodies a more contextually focused view of the data, honed to reflect the hierarchical nuances.

The weighted feature set output from the hierarchical attention mechanism 305 is then seamlessly fed into the dense layer 306. This transition marks the shift from contextually enriched feature processing to a more integrative phase of data analysis:

In the dense layer 306, this context-enriched data undergoes a transformation through a fully connected neural network structure. The layer employs a ReLU activation function (or other suitable nonlinear functions) to integrate the weighted features into a cohesive representation.

The processed data from the dense layer, now a representation capturing both the features and their hierarchical importance, is poised for the final stages of analysis in the model. It forms the basis for subsequent layers to make more informed predictions or classifications, particularly in identifying anomalies or patterns in the power distribution network.

To ensure the model's robustness and prevent overfitting, the dropout layer 307 applies random dropout to the output of the dense layer.

Finally, the processed data reaches the output layer 308. This layer, employing a sigmoid activation function for each meter, calculates a vector of anomaly scores. Each score in this vector represents the likelihood of a calibration anomaly for each corresponding meter in the power distribution network.

Through this intricate architecture, neural network model 202 is adeptly structured to provide detailed and accurate analysis of meter data, highlighting potential anomalies and calibration issues within the power distribution network 101.

The training of neural network model 202 is a critical phase where the model learns to analyze and predict based on the data from the power distribution network 101. The following steps outline the training process:

(1) Data Preparation:

Dataset Assembly: Compile a comprehensive dataset that includes historical data from the power distribution network 101. This dataset should encompass various operational scenarios, including normal operations and instances of anomalies.

Feature Selection: Ensure that the dataset includes both categorical and numerical features as previously defined, such as Meter ID, Ancestor IDs, Meter Type, and operational metrics like Current and Voltage Readings.

Preprocessing: Normalize numerical features to ensure consistent scale. Categorical features should be appropriately encoded (e.g., integer encoding for embedding layers).

(2) Defining the Training Objective:

Loss Function: Choose a loss function that aligns with the model's objective, such as Mean Squared Error (MSE) for regression tasks or Cross-Entropy Loss for classification.

Performance Metrics: Define metrics for evaluating the model's performance, like accuracy, precision, recall, or F1-score, depending on the specific task.

(3) Model Configuration:

Layer Parameters: Configure the parameters for each layer in the model, including the number of neurons in the dense layer, the number of filters in the CNN layers, and the dimensions for embedding layers.

Optimizer Selection: Choose an optimizer (like Adam, SGD, or RMSprop) that will adjust the model weights effectively during training.

(4) Training and Validation Split:

Divide the dataset into training and validation sets. A common split ratio is 80% for training and 20% for validation, though this can vary based on the dataset size and diversity.

(5) Model Training:

Batch Processing: Train the model using mini-batch gradient descent. Determine an appropriate batch size that balances computational efficiency and model performance.

Epochs: Set the number of epochs for training, ensuring that the model is exposed to the data enough times to learn effectively.

Monitoring: During training, monitor the loss and performance metrics on both the training and validation sets. Use techniques like early stopping to prevent overfitting.

(6) Hyperparameter Tuning:

Experiment with different hyperparameters, including learning rate, batch size, and layer configurations, to optimize the model's performance.

Consider using techniques like grid search or random search for systematic hyperparameter optimization.

(7) Model Evaluation:

After training, evaluate the model on the validation set to assess its performance.

Analyze metrics to ensure the model is accurately predicting anomalies and capturing the intricacies of the power distribution network.

(8) Iterations:

Based on the evaluation, iterate on the model configuration and training process to improve results.

This iterative process may involve additional data gathering, reconfiguring layers, or adjusting hyperparameters.

(9) Finalization:

Once the model achieves satisfactory performance, finalize the training process.

The trained model should be capable of analyzing incoming data from the network and predicting anomalies with high accuracy and reliability.

What is claimed is:

1. An energy management system for monitoring and managing power distribution networks, the system comprising:

a hierarchical power distribution network configured with a plurality of metering nodes organized across multiple hierarchical levels, wherein each level comprises one or more power meters for measuring energy usage, and wherein higher-level meters aggregate energy usage data from lower-level meters;

a communication gateway operatively connected to the power distribution network for secure and efficient transmission of energy usage data;

a cloud-based computing platform comprising a server for data processing and a database server for data storage, wherein the cloud-based computing platform is configured to receive transmitted energy usage data from the communication gateway;

a machine learning algorithm executed within the server, wherein the machine learning algorithm is configured to analyze the received energy usage data, the machine learning algorithm comprising a data preprocessing module for normalizing and transforming the energy usage data, and a trained neural network model for identifying patterns and anomalies in the energy usage data;

wherein the machine learning algorithm is further configured to generate an anomaly score for each power meter based on the analyzed data, the anomaly score is indicative of operational irregularities in the power meters;

a user interface accessible to users through client devices, the user interface configured to display analyzed data and corresponding anomaly scores, and to enable users to make informed decisions for energy management and optimization based on the displayed data;

a notification module within the server configured to generate and send alerts to designated customers;

wherein the notification module is activated when the machine learning algorithm identifies that an anomaly score for a power meter exceeds a predefined threshold; and wherein the alert is transmitted to designated customers via at least one communication method selected from a group consisting of email, Short Message Service (SMS), and telephone call.

2. The energy management system of claim 1, further comprising:

a data reassessment module configured to flag and reassess the measurements from a power meter within the power distribution network when the anomaly score for the power meter exceeds a predetermined threshold, indicating potential measurement inaccuracies;

wherein the data reassessment module is configured to employ a compensatory calculation method to calculate alternative measurement values for the flagged power meter by utilizing readings from adjacent nodes within the hierarchical power distribution network;

wherein the compensatory calculation method includes deriving an equivalent measurement value for the flagged power meter by subtracting the aggregate of readings from sibling nodes within the hierarchy from the reading of the parent node, or by summing the readings from the immediate child nodes of the flagged power meter;

and wherein the equivalent measurement value is utilized as a substitute for the original reading of the flagged power meter to maintain the accuracy and reliability of the data within the power distribution network.

3. The energy management system of claim 1, wherein the user interface is further configured to classify and display the anomaly scores in at least three distinct categories based on their severity levels.

4. The energy management system of claim 1, wherein the user interface includes a color-coded status indicator for each power meter, the color coding representing different levels of operational performance based on the anomaly scores; with specific colors assigned to indicate normal operation, caution, and critical conditions, thereby providing an intuitive visual representation of the power network's status for quick assessment by the users.

5. The energy management system of claim 1, wherein the user interface is configured to provide a customizable dashboard that allows users to select and prioritize specific data points or metrics, including anomaly scores, for display; enabling users to tailor the interface according to their specific monitoring and management needs, and enhancing the ease of access to the most relevant information.

6. The energy management system of claim 1, wherein the user interface features an interactive map of the power distribution network, visually representing the location and status of each metering node; the map interface enabling users to click on individual nodes to retrieve detailed data and anomaly scores, thereby facilitating a spatial understanding of the network's performance.

7. The energy management system of claim 1, wherein the user interface incorporates a notification filter module, allowing users to set customizable alert thresholds and preferences for receiving notifications based on the severity of anomaly scores; such customization enabling users to focus on the most critical alerts and reduce notification fatigue.

8. The energy management system of claim 1, wherein the user interface includes a historical data analysis tool that allows users to view and compare anomaly scores over time for each metering node; providing insights into historical trends and patterns in energy usage and operational irregularities, aiding in long-term strategic planning and preventive maintenance scheduling.

* * * * *